US006395324B1

(12) United States Patent
Effey et al.

(10) Patent No.: US 6,395,324 B1
(45) Date of Patent: May 28, 2002

(54) POURABLE FATTY DISPERSIONS

(75) Inventors: Jochen Effey; Eckhard Floeter; Rowdy Van Gelder, all of Vlaardinegn; Jan P Van Iersel, Delft, all of (NL)

(73) Assignee: Lipton, Division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/615,513

(22) Filed: Jul. 13, 2000

(51) Int. Cl.[7] .................................................. A23D 9/00
(52) U.S. Cl. ....................................... 426/606; 554/227
(58) Field of Search ................. 426/601, 606; 554/227

(56) References Cited

U.S. PATENT DOCUMENTS

| | | | |
|---|---|---|---|
| 3,338,720 A | | 8/1967 | Pichel |
| 4,341,812 A | * | 7/1982 | Ward ........................... 426/603 |
| 4,341,813 A | * | 7/1982 | Ward ........................... 426/603 |
| 4,359,482 A | * | 11/1982 | Crosby ........................ 426/606 |
| 4,446,165 A | * | 5/1984 | Roberts ....................... 426/602 |
| 4,726,959 A | | 2/1988 | Momura et al. |
| 5,211,981 A | * | 5/1993 | Purves ........................ 426/606 |
| 5,254,356 A | * | 10/1993 | Busken ........................ 426/553 |
| 5,756,142 A | | 5/1998 | Reckweg |
| 6,022,577 A | * | 2/2000 | Chrysam .................... 426/601 |

FOREIGN PATENT DOCUMENTS

| | | |
|---|---|---|
| EP | 0 089 082 | 9/1983 |
| EP | 0 775 444 | 10/1995 |
| GB | 1092236 | 3/1966 |
| WO | 95/25433 | 9/1995 |
| WO | WO98/47386 | * 10/1998 |

OTHER PUBLICATIONS

Hui, editor, 1996. Bailey's Industrial Oil and Fat Products. 5th edition, vol. 2, John Wiley & Sons, Inc. New York. p. 33.*
Hui, editor, 1996, Bailey's Industrial Oil and Fat Products. 5th edition, vol. 3, John Wiley & Sonc, Inc. New York, p. 83, 84, 89–91, 180.*
Hui, editor, 1996. Bailey's Industrial Oil and Fat Products. 5th edition, vol. 4, John Wiley & Sons, Inc. New York. pp. 173, 178, 179, 274–278.*
Swern, edtior, 1919. Bailey's Industrial Oil and Fat Products. 4th edition, vol. 1, John Wiley & Sons, Inc. New York. pp. 382–385, 416–418, 429–432.*
European Search Report.

* cited by examiner

*Primary Examiner*—Carolyn Paden
(74) *Attorney, Agent, or Firm*—Milton L. Honig

(57) ABSTRACT

The present invention provides a hardstock fat which is suitable for stabilizing a dispersion of a non-fat phase in a triglyceride oil, including liquid margarines, which hardstock fat consists of a mixture of triglycerides, characterized in that, at least two triglycerides having a melting point >55° C. each have a concentration of at least 5 wt. %, the amount of triglycerides having fatty acid residues with a difference in chain length of the longest and the shortest residue of at least four carbon atoms is at least 15 wt. % and the amount of triglycerides with a melting point of 25–55° C. is ≦25 wt. %.

10 Claims, 10 Drawing Sheets

Figure 1/1

| TAG | ΔC | $T_{SL}$ [°C] | TAG | ΔC | $T_{SL}$ [°C] | TAG | ΔC | $T_{SL}$ [°C] |
|---|---|---|---|---|---|---|---|---|
| A.A.A | 0 | 77.8 | L.P.B | 6 | 35 | P.A.S | 4 | 67 |
| A.A.B | 2 | 74.5 | L.P.S | 2 | 31.6 | P.B.A | 6 | 68.4 |
| A.B.A | 2 | 78 | L.S.A | 2 | 36.7 | P.B.B | 6 | 66.1 |
| A.B.B | 2 | 76.4 | L.S.B | 4 | 38.4 | P.B.L | 6 | 36.5 |
| A.L.A | 2 | 41.6 | L.S.S | 0 | 35.4 | P.B.O | 6 | 44.2 |
| A.L.B | 4 | 42.7 | La.Ci.La | 2 | 40.2 | P.B.P | 6 | 65.5 |
| A.O.A | 2 | 50 | La.Ci.My | 4 | 38.7 | P.B.S | 6 | 67.4 |
| A.O.B | 4 | 49.5 | La.Ci.S | 8 | 45.9 | P.Ci.P | 6 | 51.9 |
| A.P.A | 4 | 70.3 | La.Cy.La | 4 | 34.9 | P.Ci.S | 8 | 49.4 |
| A.P.B | 6 | 67.2 | La.Cy.My | 6 | 32.8 | P.Cy.P | 8 | 48.2 |
| A.S.A | 2 | 74 | La.Cy.P | 8 | 31.8 | P.Cy.S | 10 | 47.4 |
| A.S.B | 4 | 71.3 | La.Cy.S | 10 | 50.7 | P.E.A | 4 | 53.7 |
| A.S.Tc | 6 | 69.4 | La.E.La | 6 | 36.6 | P.E.B | 6 | 54.6 |
| B.A.B | 2 | 78.7 | La.E.P | 6 | 43.1 | P.E.E | 2 | 44.1 |
| B.B.B | 0 | 82.5 | La.E.S | 6 | 46.8 | P.E.P | 2 | 53.7 |
| B.B.Tc | 2 | 78.9 | La.La.E | 6 | 35 | P.E.S | 2 | 53.4 |
| B.L.B | 4 | 47.1 | La.La.La | 0 | 46 | P.E.Tc | 8 | 56.1 |
| B.O.B | 4 | 53.7 | La.La.My | 2 | 44.2 | P.L.A | 4 | 31.7 |
| B.P.B | 6 | 71.2 | La.La.P | 4 | 46.5 | P.L.B | 6 | 32.8 |
| B.S.B | 4 | 72.5 | La.La.S | 6 | 45 | P.L.P | 2 | 27.6 |
| B.S.Tc | 6 | 72.3 | La.My.La | 2 | 48.4 | P.L.S | 2 | 28.8 |
| B.Tc.B | 2 | 82.2 | La.My.My | 2 | 48.5 | P.La.E | 6 | 42 |
| Ci.La.La | 2 | 36.1 | La.My.P | 4 | 49.4 | P.La.P | 4 | 56.6 |
| Ci.La.My | 4 | 38.3 | La.My.S | 6 | 51 | P.La.S | 6 | 53.6 |
| Ci.La.P | 6 | 41.1 | La.P.E | 6 | 42.8 | P.My.L | 4 | 20 |
| Ci.La.S | 8 | 44.3 | La.P.La | 4 | 46.7 | P.My.O | 4 | 30 |
| Ci.My.La | 4 | 40.3 | La.P.My | 4 | 51.4 | P.My.P | 2 | 61.1 |
| Ci.My.P | 6 | 46.6 | La.P.P | 4 | 49.5 | P.My.S | 4 | 58.6 |
| Ci.My.S | 8 | 50.3 | La.P.S | 6 | 52 | P.O.A | 4 | 39.9 |
| Ci.P.La | 6 | 43.2 | La.S.E | 6 | 46.8 | P.O.B | 6 | 40.7 |
| Ci.P.My | 6 | 46.9 | La.S.La | 6 | 47 | P.O.O | 2 | 15.8 |
| Ci.P.P | 6 | 50.9 | La.S.My | 6 | 53.1 | P.O.P | 2 | 37.2 |
| Ci.P.S | 8 | 55.1 | La.S.P | 6 | 55.5 | P.O.S | 2 | 37.4 |
| Ci.S.La | 8 | 45.2 | La.S.S | 6 | 52 | P.P.A | 4 | 61.7 |
| Ci.S.My | 8 | 49.7 | My.Ci.P | 6 | 44.4 | P.P.B | 6 | 61.4 |
| Ci.S.P | 8 | 54.3 | My.Ci.S | 8 | 49.1 | P.P.E | 2 | 50.2 |
| Ci.S.S | 8 | 58.9 | My.Cy.P | 8 | 39.9 | P.P.L | 2 | 26.5 |
| Cy.Cy.La | 4 | 17.4 | My.L.P | 4 | 20.7 | P.P.O | 2 | 34.5 |
| Cy.Cy.S | 10 | 24.1 | My.La.My | 2 | 52 | P.P.P | 0 | 66 |

Figure 1/2

| TAG | ΔC | $T_{SL}$ [°C] |
|---|---|---|
| Cy.La.La | 4 | 30.6 |
| Cy.La.My | 6 | 35.8 |
| Cy.La.P | 8 | 41.1 |
| Cy.La.S | 10 | 46.4 |
| Cy.My.La | 6 | 36.2 |
| Cy.My.P | 8 | 47.5 |
| Cy.My.S | 10 | 53 |
| Cy.P.La | 8 | 40.8 |
| Cy.P.My | 8 | 47 |
| Cy.P.P | 8 | 53 |
| Cy.P.S | 10 | 58.8 |
| Cy.S.La | 10 | 45.2 |
| Cy.S.My | 10 | 51.8 |
| Cy.S.P | 10 | 58 |
| Cy.S.S | 10 | 64 |
| E.E.A | 2 | 49.3 |
| E.E.B | 4 | 49.1 |
| E.E.E | 0 | 42 |
| E.E.S | 0 | 50.2 |
| E.E.Tc | 6 | 50.2 |
| E.La.S | 6 | 47.7 |
| E.P.E | 2 | 46.9 |
| E.P.S | 2 | 56.1 |
| E.S.A | 2 | 57.9 |
| E.S.B | 4 | 57.4 |
| E.S.E | 0 | 50.2 |
| E.S.S | 0 | 59.3 |
| E.S.Tc | 6 | 57.6 |
| L.A.A | 2 | 40.2 |
| L.A.B | 4 | 41.7 |
| L.A.S | 2 | 38.2 |
| L.B.A | 4 | 43.1 |
| L.B.B | 4 | 44.6 |
| L.B.L | 4 | 13.5 |
| L.B.S | 4 | 40.7 |
| L.L.B | 4 | 10.9 |
| L.L.L | 0 | -14.1 |
| L.P.A | 4 | 32.7 |

| TAG | ΔC | $T_{SL}$ [°C] |
|---|---|---|
| My.La.P | 4 | 49.9 |
| My.La.S | 6 | 39.6 |
| My.My.P | 2 | 54.5 |
| My.My.S | 4 | 54 |
| My.O.O | 4 | 8.4 |
| My.O.P | 4 | 30.5 |
| My.O.S | 4 | 32.9 |
| My.P.My | 2 | 58.7 |
| My.P.O | 4 | 29.2 |
| My.P.P | 2 | 58 |
| My.P.S | 4 | 58.1 |
| My.S.My | 4 | 59.9 |
| My.S.P | 4 | 60.4 |
| My.S.S | 4 | 62 |
| O.A.A | 2 | 47.3 |
| O.A.B | 4 | 48.6 |
| O.A.O | 2 | 26.4 |
| O.A.S | 2 | 47.6 |
| O.B.A | 4 | 49.9 |
| O.B.B | 4 | 51.1 |
| O.B.O | 4 | 28.8 |
| O.B.S | 4 | 49 |
| O.O.A | 2 | 29.2 |
| O.O.B | 4 | 33.3 |
| O.O.S | 0 | 22.9 |
| O.P.A | 4 | 40.8 |
| O.P.B | 6 | 43 |
| O.P.O | 2 | 18.7 |
| O.P.S | 2 | 40.5 |
| O.S.A | 2 | 44.3 |
| O.S.B | 4 | 45.8 |
| O.S.O | 0 | 22.8 |
| O.S.S | 0 | 42.5 |
| P.A.A | 4 | 67.3 |
| P.A.B | 6 | 68.1 |
| P.A.L | 4 | 33.2 |
| P.A.O | 4 | 41.3 |
| P.A.P | 4 | 67.3 |

| TAG | ΔC | $T_{SL}$ [°C] |
|---|---|---|
| P.P.S | 2 | 62.5 |
| P.S.A | 4 | 65.1 |
| P.S.B | 6 | 65.4 |
| P.S.E | 2 | 53.4 |
| P.S.L | 2 | 29.3 |
| P.S.O | 2 | 37.2 |
| P.S.P | 2 | 68 |
| P.S.S | 2 | 65 |
| P.S.Tc | 8 | 66.2 |
| S.A.A | 2 | 71.5 |
| S.A.B | 4 | 70.8 |
| S.A.S | 2 | 72.9 |
| S.B.A | 4 | 72.6 |
| S.B.B | 4 | 73.5 |
| S.B.S | 4 | 70.6 |
| S.B.Tc | 6 | 73.1 |
| S.Cy.S | 10 | 52.8 |
| S.E.A | 2 | 57.9 |
| S.E.B | 4 | 57.4 |
| S.E.S | 0 | 61 |
| S.E.Tc | 6 | 57.6 |
| S.L.A | 2 | 36.7 |
| S.L.B | 4 | 38.4 |
| S.L.S | 0 | 35.4 |
| S.La.S | 6 | 58 |
| S.My.S | 4 | 64.2 |
| S.O.A | 2 | 44.3 |
| S.O.B | 4 | 45.8 |
| S.O.S | 0 | 43.5 |
| S.P.A | 4 | 65.6 |
| S.P.B | 6 | 63.8 |
| S.P.S | 2 | 68 |
| S.S.A | 2 | 69.1 |
| S.S.B | 4 | 70.7 |
| S.S.S | 0 | 73 |
| S.S.Tc | 6 | 67.3 |
| S.Tc.B | 6 | 73.3 |
| S.Tc.S | 6 | 72.6 |

Figure 2/1

| TAG | ΔC-atoms | T$_{SL}$ | BO65 | PO58 | SF69 | RP68 | dfPOs | AR60 | CS62 | RPh70 | ln(RPh70) |
|---|---|---|---|---|---|---|---|---|---|---|---|
| | | [°C] | concentration [w/w %] | | | | | | | | |
| S.S.S | 0 | 66.0 | 65.8 | 10.6 | 76.4 | 75.0 | | 4.9 | 42.9 | 1.4 | 6.5 |
| P.S.S | 2 | 65.0 | 28.0 | 35.8 | 18.9 | 14.6 | 0.2 | 4.3 | 39.7 | 1.8 | 1.9 |
| P.S.P | 2 | 68.0 | 3.0 | 30.3 | 1.2 | 0.7 | 3.1 | 0.9 | 9.2 | 0.6 | 0.1 |
| S.S.A | 2 | 69.1 | 1.5 | 0.4 | 0.9 | 4.7 | | 0.4 | 0.7 | 3.2 | 3.1 |
| S.P.S | 2 | 68.0 | 0.7 | 2.2 | 0.4 | 2.1 | | 0.3 | 1.1 | | 1.0 |
| P.S.A | 4 | 65.1 | 0.3 | 0.6 | 0.1 | 0.5 | | 0.2 | 0.3 | 2.1 | 0.5 |
| P.P.S | 2 | 62.5 | 0.3 | 7.5 | 0.1 | 0.4 | 1.1 | 0.2 | 1.0 | | 0.3 |
| My.S.S | 4 | 62.0 | 0.3 | 0.7 | | | | | 1.4 | | |
| P.P.P | 0 | 66.0 | | 6.4 | | | 17.4 | | 0.2 | | |
| My.S.P | 4 | 60.4 | | 1.2 | | | 0.4 | | 0.7 | | |
| P.S.E | 2 | 53.4 | | 0.7 | | | | 5.2 | 0.9 | | |
| P.E.S | 2 | 53.4 | | 0.7 | | | | 6.5 | | | |
| P.E.P | 2 | 53.7 | | 0.6 | | | | 1.4 | | | |
| P.My.S | 4 | 58.4 | | 0.5 | | | | | | | |
| P.My.P | 2 | 61.1 | | 0.5 | | | 0.9 | | | | |
| E.S.S | 0 | 59.3 | | 0.4 | | | | | 12.0 | 1.9 | |
| My.P.P | 2 | 58.0 | | 0.2 | | | 2.3 | | | | |
| S.E.S | 0 | 61.0 | | 0.2 | | | | 7.5 | | | |
| S.My.S | 4 | 64.2 | | 0.2 | | | | | | | |
| P.P.E | 2 | 50.2 | | 0.1 | | | | 0.3 | | | |
| My.P.S | 4 | 58.1 | | 0.1 | | | | | | | |
| P.P.A | 4 | 61.7 | | 0.1 | | | | | | | |
| S.S.B | 4 | 70.7 | | | 1.7 | 1.7 | | 0.9 | | 15.0 | 14.1 |
| P.S.B | 6 | 65.4 | | | 0.2 | 0.2 | | 0.4 | | 9.8 | 2.1 |
| S.P.A | 4 | 65.6 | | | | 0.1 | | | | | 0.5 |
| P.O.P | 2 | 37.2 | | | | | 23.8 | | | | |
| P.O.O | 2 | 15.8 | | | | | 14.8 | | | | |
| L.L.L | 0 | -14.1 | | | | | 12.6 | | | | |
| P.P.O | 2 | 34.5 | | | | | 5.9 | | | | |
| P.L.P | 2 | 27.6 | | | | | 5.6 | | | | |
| P.O.S | 2 | 37.4 | | | | | 3.8 | | | | |
| O.O.S | 0 | 22.9 | | | | | 1.4 | | | | |
| My.O.P | 4 | 30.5 | | | | | 1.3 | | | | |
| P.L.S | 2 | 28.8 | | | | | 1.1 | | | | |

Figure 2/2

| TAG | ΔC-atoms | $T_{SL}$ [°C] | BO65 | PO58 | SF69 | RP68 | dfPOs | AR60 | CS62 | RPh70 | in(RPh70) |
|---|---|---|---|---|---|---|---|---|---|---|---|
| | | | | | | | concentration [w/w %] | | | | |
| P.P.L | 2 | 26.5 | | | | | 1.0 | | | | |
| O.P.O | 2 | 18.7 | | | | | 0.8 | | | | |
| O.P.S | 2 | 40.5 | | | | | 0.5 | | | | |
| My.O.O | 4 | 8.4 | | | | | 0.4 | | | | |
| P.S.O | 2 | 37.2 | | | | | 0.4 | | | | |
| My.L.P | 4 | 20.7 | | | | | 0.3 | | | | |
| P.My.O | 4 | 30.0 | | | | | 0.3 | | | | |
| My.P.O | 4 | 29.2 | | | | | 0.2 | | | | |
| S.O.S | 0 | 43.5 | | | | | 0.2 | | | | |
| My.My.P | 2 | 54.5 | | | | | 0.1 | | | | |
| P.My.L | 4 | 20.0 | | | | | 0.1 | | | | |
| My.O.S | 4 | 32.9 | | | | | 0.1 | | | | |
| E.E.S | 0 | 50.2 | | | | | | 18.3 | | | |
| E.E.E | 0 | 42.0 | | | | | | 11.2 | | | |
| P.E.E | 2 | 44.1 | | | | | | 8.0 | | | |
| E.S.E | 0 | 50.2 | | | | | | 7.3 | | | |
| E.E.B | 4 | 49.1 | | | | | | 1.6 | | | |
| S.E.B | 4 | 57.4 | | | | | | 1.3 | | | |
| E.S.B | 4 | 57.4 | | | | | | 1.1 | | | |
| E.E.A | 2 | 49.3 | | | | | | 0.7 | | | |
| E.P.S | 2 | 56.1 | | | | | | 0.7 | | | |
| E.E.Tc | 6 | 50.2 | | | | | | 0.6 | | | |
| S.E.A | 2 | 57.9 | | | | | | 0.6 | | | |
| P.E.B | 6 | 54.6 | | | | | | 0.6 | | | |
| S.E.Tc | 6 | 57.6 | | | | | | 0.5 | | | |
| E.S.A | 2 | 57.9 | | | | | | 0.5 | | | |
| E.P.E | 2 | 46.9 | | | | | | 0.4 | | | |
| E.S.Tc | 6 | 57.6 | | | | | | 0.4 | | | |
| S.S.Tc | 6 | 67.3 | | | | | | 0.3 | | | 0.3 | 0.3 |
| P.E.A | 4 | 53.7 | | | | | | 0.3 | | | |
| P.E.Tc | 8 | 56.1 | | | | | | 0.2 | | | |
| P.S.Tc | 8 | 66.2 | | | | | | 0.1 | | | 0.2 | |
| B.S.B | 4 | 72.5 | | | | | | | | | 40.9 | 7.7 |
| A.S.B | 4 | 71.3 | | | | | | | | | 17.4 | 3.4 |

Figure 2/3

| TAG | ΔC-atoms | $T_{SL}$ [°C] | BO65 | PO58 | SF69 | RP68 | dfPOs | AR60 | CS62 | RPh70 | in(RPh70) |
|---|---|---|---|---|---|---|---|---|---|---|---|
| | | | concentration [w/w %] | | | | | | | | |
| A.S.A | 2 | 74.0 | | | | | | | | 1.9 | 0.4 |
| B.S.Tc | 6 | 72.3 | | | | | | | | 1.7 | 0.3 |
| B.P.B | 6 | 71.2 | | | | | | | | 0.9 | 1.1 |
| A.P.B | 6 | 67.2 | | | | | | | | 0.4 | 0.5 |
| B.A.B | 2 | 78.7 | | | | | | | | 0.4 | 1.8 |
| A.S.Tc | 6 | 69.4 | | | | | | | | 0.4 | |
| B.B.B | 0 | 82.5 | | | | | | | | 0.4 | 8.4 |
| S.P.B | 6 | 63.8 | | | | | | | | 0.3 | 2.1 |
| P.P.B | 6 | 61.4 | | | | | | | | 0.2 | 0.3 |
| A.A.B | 2 | 74.5 | | | | | | | | 0.2 | 0.8 |
| A.B.B | 2 | 76.4 | | | | | | | | 0.2 | 3.7 |
| S.A.B | 4 | 70.8 | | | | | | | | 0.1 | 3.4 |
| S.B.B | 4 | 73.5 | | | | | | | | 0.1 | 15.4 |
| S.B.S | 4 | 70.6 | | | | | | | | | 7.0 |
| S.B.A | 4 | 72.6 | | | | | | | | | 3.4 |
| P.B.B | 6 | 66.1 | | | | | | | | | 2.3 |
| P.B.S | 6 | 67.4 | | | | | | | | | 2.1 |
| S.A.S | 2 | 72.9 | | | | | | | | | 1.5 |
| S.A.A | 2 | 71.5 | | | | | | | | | 0.7 |
| P.A.B | 6 | 68.1 | | | | | | | | | 0.5 |
| P.B.A | 6 | 68.4 | | | | | | | | | 0.5 |
| P.A.S | 4 | 67.0 | | | | | | | | | 0.5 |
| A.B.A | 2 | 78.0 | | | | | | | | | 0.4 |
| B.B.Tc | 2 | 78.9 | | | | | | | | | 0.4 |
| S.Tc.B | 6 | 73.3 | | | | | | | | | 0.3 |
| S.B.Tc | 6 | 73.1 | | | | | | | | | 0.3 |
| B.Tc.B | 2 | 82.2 | | | | | | | | | 0.2 |
| P.B.P | 4 | 65.5 | | | | | | | | | 0.2 |
| S.Tc.S | 6 | 72.6 | | | | | | | | | 0.1 |
| P.A.A | 4 | 67.3 | | | | | | | | | 0.1 |
| TAG(Δ≥C4;$T_{SL}$>55°C) | | | 0.6 | 3.5 | 2.1 | 2.5 | 1.2 | 5.3 | 2.4 | 90.1 | 68.9 |
| 25<$T_{SL}$<55 | | | 0 | 2.1 | 0 | 0 | 45.6 | 62.4 | 0.9 | 0 | 0 |

Figure 3/1

| TAG | ΔC-atoms | $T_{SL}$ [°C] | 10RPh70/ 90BO65 | 30RPh70/ 70BO65 | 50AR60/ 50RP69 | 50AR60/ 50CS62 | 50PO58/ 50SF69 | in(40PO58/ 60PK39) | 40dfPOs/ 60RPh70 | 50RPh70/ 50SF69 | 75in(RPh70)/ 25BO65 |
|---|---|---|---|---|---|---|---|---|---|---|---|
| | | | concentration [w/w %] | | | | | | | | |
| S.S.S | 0 | 66.0 | 60.1 | 48.1 | 40.0 | 24.1 | 43.0 | 2.2 | 0.8 | 40.9 | 22.5 |
| P.S.S | 2 | 65.0 | 25.7 | 20.8 | 9.5 | 22.1 | 27.6 | 3.3 | 1.1 | 10.8 | 9.0 |
| P.S.P | 2 | 68.0 | 2.8 | 2.3 | 0.8 | 5.1 | 16.1 | 1.2 | 1.7 | 0.9 | 0.9 |
| S.S.A | 2 | 69.1 | 1.7 | 2.0 | 2.5 | 0.5 | 0.7 | | 1.8 | 2.0 | 2.7 |
| S.P.S | 2 | 68.0 | 0.7 | 0.5 | 1.2 | 0.7 | 1.3 | 1.6 | | 0.2 | 0.9 |
| P.S.A | 4 | 65.1 | 0.5 | 0.8 | 0.3 | 0.2 | 0.4 | | 1.2 | 1.1 | 0.4 |
| P.P.S | 2 | 62.5 | 0.3 | 0.2 | 0.3 | 0.6 | 3.9 | 2.4 | 0.5 | | 0.3 |
| My.S.S | 4 | 62.0 | 0.3 | 0.2 | | 0.7 | 0.3 | 1.5 | | | |
| P.P.P | 0 | 66.0 | | | | 0.1 | 3.3 | 0.9 | 7.7 | | |
| My.S.P | 4 | 60.4 | | | | 0.3 | 0.6 | 1.1 | 0.2 | | |
| P.S.E | 2 | 53.4 | | | 2.6 | 3.0 | 0.4 | 0.2 | | | |
| P.E.S | 2 | 53.4 | | | 3.3 | 3.2 | 0.3 | 0.2 | | | |
| P.E.P | 2 | 53.7 | | | 0.7 | 0.7 | 0.3 | | | | |
| P.My.S | 4 | 58.4 | | | | | 0.3 | 1.1 | | | |
| P.My.P | 2 | 61.1 | | | | | 0.2 | 0.4 | 0.4 | | |
| E.S.S | 0 | 59.3 | | | 6.0 | 6.9 | 0.2 | 0.2 | | | |
| My.P.P | 2 | 58.0 | | | | | 0.1 | 0.8 | 1.0 | | |
| S.E.S | 0 | 61.0 | | | 3.7 | 3.7 | | | | | |
| S.My.S | 4 | 64.2 | | | | | | 0.7 | | | |
| P.P.E | 2 | 50.2 | | | 0.1 | 0.2 | | 0.1 | | | |
| My.P.S | 4 | 58.1 | | | | | | 1.1 | | | |
| P.P.A | 4 | 61.7 | | | | | | | | | |
| S.S.B | 4 | 70.7 | 1.4 | 4.2 | 1.3 | 0.4 | 0.9 | | 8.5 | 8.1 | 10.3 |
| P.S.B | 6 | 65.4 | 0.9 | 2.8 | 0.3 | 0.2 | 0.1 | | 5.6 | 4.8 | 1.5 |
| S.P.A | 4 | 65.6 | | | | | | | | | 0.3 |
| P.O.P | 2 | 37.2 | | | | | | | 10.5 | | |
| P.O.O | 2 | 15.8 | | | | | | | 6.5 | | |
| L.L.L | 0 | -14.1 | | | | | | | 5.6 | | |
| P.P.O | 2 | 34.5 | | | | | | | 2.6 | | |
| P.L.P | 2 | 27.6 | | | | | | | 2.4 | | |
| P.O.S | 2 | 37.4 | | | | | | | 1.7 | | |
| O.O.S | 0 | 22.9 | | | | | | | 0.6 | | |
| My.O.P | 4 | 30.5 | | | | | | | 0.6 | | |
| P.L.S | 2 | 28.8 | | | | | | | 0.5 | | |
| P.P.L | 2 | 26.5 | | | | | | | 0.4 | | |

Figure 3/2

| TAG | ΔC-atoms | $T_{SL}$ [°C] | 10RPh70/ 90BO65 | 30RPh70/ 70BO65 | 50AR60/ 50RP69 | 50AR60/ 50CS62 | 50PO58/ 50SF69 | in(40PO58/ 60PK39) | 40dfPOs/ 60RPh70 | 50RPh70/ 50SF69 | 75in(RPh70)/ 25BO65 |
|---|---|---|---|---|---|---|---|---|---|---|---|
|  |  |  | concentration [w/w %] |  |  |  |  |  |  |  |  |
| O.P.O | 2 | 18.7 |  |  |  |  |  |  | 0.3 |  |  |
| O.P.S | 2 | 40.5 |  |  |  |  |  |  | 0.2 |  |  |
| My.O.O | 4 | 8.4 |  |  |  |  |  |  | 0.2 |  |  |
| P.S.O | 2 | 37.2 |  |  |  |  |  |  | 0.2 |  |  |
| My.L.P | 4 | 20.7 |  |  |  |  |  |  | 0.1 |  |  |
| P.My.O | 4 | 30.0 |  |  |  |  |  |  | 0.1 |  |  |
| My.My.P | 2 | 54.5 |  |  |  |  |  | 0.4 |  |  |  |
| E.E.S | 0 | 50.2 |  |  | 9.1 | 9.1 |  |  |  |  |  |
| E.E.E | 0 | 42.0 |  |  | 5.6 | 5.5 |  |  |  |  |  |
| P.E.E | 2 | 44.1 |  |  | 4.0 | 4.0 |  |  |  |  |  |
| E.S.E | 0 | 50.2 |  |  | 3.7 | 3.6 |  |  |  |  |  |
| E.E.B | 4 | 49.1 |  |  | 0.8 | 0.8 |  |  |  |  |  |
| S.E.B | 4 | 57.4 |  |  | 0.7 | 0.7 |  |  |  |  |  |
| E.S.B | 4 | 57.4 |  |  | 0.5 | 0.5 |  |  |  |  |  |
| E.E.A | 2 | 49.3 |  |  | 0.4 | 0.3 |  |  |  |  |  |
| E.P.S | 2 | 56.1 |  |  | 0.3 | 0.4 |  |  | 0.2 |  |  |
| E.E.Tc | 6 | 50.2 |  |  | 0.3 | 0.3 |  |  |  |  |  |
| S.E.A | 2 | 57.9 |  |  | 0.3 | 0.3 |  |  |  |  |  |
| P.E.B | 6 | 54.6 |  |  | 0.3 | 0.3 |  |  |  |  |  |
| S.E.Tc | 6 | 57.6 |  |  | 0.2 | 0.2 |  |  |  |  |  |
| E.S.A | 2 | 57.9 |  |  | 0.2 | 0.2 |  |  |  |  |  |
| E.P.E | 2 | 46.9 |  |  | 0.2 | 0.2 |  |  |  |  |  |
| E.S.Tc | 6 | 57.6 |  |  | 0.2 | 0.2 |  |  |  |  |  |
| S.S.Tc | 6 | 67.3 |  |  | 0.2 | 0.2 |  |  | 0.2 | 0.2 | 0.2 |
| P.E.A | 4 | 53.7 |  |  | 0.1 | 0.1 |  |  |  |  |  |
| P.E.Tc | 8 | 56.1 |  |  | 0.1 | 0.1 |  |  |  |  |  |
| P.S.Tc | 8 | 66.2 |  |  |  |  |  |  | 0.1 |  |  |
| B.S.B | 4 | 72.5 | 3.7 | 11.5 |  |  |  |  | 23.2 | 19.5 | 5.6 |
| A.S.B | 4 | 71.3 | 1.6 | 4.9 |  |  |  |  | 9.9 | 8.3 | 2.5 |
| A.S.A | 2 | 74.0 | 0.2 | 0.5 |  |  |  |  | 1.1 | 0.9 | 0.3 |
| B.S.Tc | 6 | 72.3 | 0.2 | 0.5 |  |  |  |  | 1.0 | 0.8 | 0.2 |
| B.P.B | 6 | 71.2 |  | 0.3 |  |  |  |  | 0.5 | 0.5 | 0.8 |
| A.P.B | 6 | 67.2 |  | 0.1 |  |  |  |  | 0.2 | 0.2 | 0.4 |
| B.A.B | 2 | 78.7 |  | 0.1 |  |  |  |  | 0.2 | 0.2 | 1.3 |
| A.S.Tc | 6 | 69.4 |  | 0.1 |  |  |  |  | 0.2 | 0.2 |  |

Figure 3/3

| TAG | ΔC-atoms | $T_{SL}$ [°C] | 10RPh70/ 90BO65 | 30RPh70/ 70BO65 | 50AR60/ 50RP69 | 50AR60/ 50CS62 | 50PO58/ 50SF69 | in(40PO58/ 60PK39) | 40dfPOs/ 60RPh70 | 50RPh70/ 50SF69 | 75in(RPh70)/ 25BO65 |
|---|---|---|---|---|---|---|---|---|---|---|---|
| | | | concentration [w/w %] | | | | | | | | |
| B.B.B | 0 | 82.5 | | | | | | | 0.2 | 0.2 | 6.1 |
| S.P.B | 6 | 63.8 | | | | | | | 0.2 | 0.2 | 1.5 |
| P.P.B | 6 | 61.4 | | | | | | | 0.1 | 0.1 | 0.2 |
| A.A.B | 2 | 74.5 | | | | | | | | | 0.6 |
| A.B.B | 2 | 76.4 | | | | | | | | | 2.7 |
| S.A.B | 4 | 70.8 | | | | | | | | | 2.5 |
| S.B.B | 4 | 73.5 | | | | | | | | | 11.2 |
| S.B.S | 4 | 70.6 | | | | | | | | | 5.2 |
| S.B.A | 4 | 72.6 | | | | | | | | | 2.5 |
| P.B.B | 6 | 66.1 | | | | | | | | | 1.7 |
| P.B.S | 6 | 67.4 | | | | | | | | | 1.5 |
| S.A.S | 2 | 72.9 | | | | | | | | | 1.1 |
| S.A.A | 2 | 71.5 | | | | | | | | | 0.5 |
| P.A.B | 6 | 68.1 | | | | | | | | | 0.4 |
| P.B.A | 6 | 68.4 | | | | | | | | | 0.4 |
| P.A.S | 4 | 67.0 | | | | | | | | | 0.3 |
| A.B.A | 2 | 78.0 | | | | | | | | | 0.3 |
| B.B.Tc | 2 | 78.9 | | | | | | | | | 0.3 |
| S.Tc.B | 6 | 73.3 | | | | | | | | | 0.2 |
| S.B.Tc | 6 | 73.1 | | | | | | | | | 0.2 |
| B.Tc.B | 2 | 82.2 | | | | | | | | | 0.1 |
| P.B.P | 4 | 65.5 | | | | | | | | | 0.1 |
| S.Tc.S | 6 | 72.6 | | | | | | | | | 0.1 |
| La.La.S | 6 | 45.0 | | | | | | 6.4 | | | |
| La.S.S | 6 | 52.0 | | | | | | 5.3 | | | |
| La.La.P | 4 | 46.5 | | | | | | 4.8 | | | |
| P.La.S | 4 | 53.6 | | | | | | 3.9 | | | |
| La.S.P | 4 | 55.5 | | | | | | 3.9 | | | |
| La.P.S | 4 | 52.0 | | | | | | 3.9 | | | |
| La.La.La | 0 | 46.0 | | | | | | 3.9 | | | |
| La.S.La | 6 | 47.0 | | | | | | 3.2 | | | |
| La.P.P | 4 | 49.5 | | | | | | 2.9 | | | |
| S.La.S | 6 | 58.0 | | | | | | 2.7 | | | |
| La.P.La | 4 | 46.7 | | | | | | 2.4 | | | |
| La.La.My | 2 | 44.2 | | | | | | 2.1 | | | |

Figure 3/4

| TAG | ΔC-atoms | $T_{SL}$ [°C] | 10RPh70/ 90BO65 | 30RPh70/ 70BO65 | 50AR60/ 50RP69 | 50AR60/ 50CS62 | 50PO58/ 50SF69 | in(40PO58/ 60PK39) concentration [w/w %] | 40dfPOs/ 60RPh70 | 50RPh70/ 50SF69 | 75in(RPh70/ 25BO65 |
|---|---|---|---|---|---|---|---|---|---|---|---|
| La.S.My | 6 | 53.1 | | | | | | 1.8 | | | |
| La.My.S | 6 | 51.0 | | | | | | 1.8 | | | |
| My.La.S | 6 | 50.0 | | | | | | 1.8 | | | |
| P.La.P | 4 | 56.6 | | | | | | 1.5 | | | |
| La.My.P | 4 | 49.4 | | | | | | 1.3 | | | |
| My.La.P | 4 | 49.9 | | | | | | 1.3 | | | |
| La.P.My | 4 | 51.4 | | | | | | 1.3 | | | |
| La.Cy.P | 8 | 31.8 | | | | | | 1.1 | | | |
| La.My.La | 2 | 48.4 | | | | | | 1.1 | | | |
| La.Cy.S | 10 | 50.7 | | | | | | 1.1 | | | |
| Cy.La.La | 4 | 30.6 | | | | | | 1.0 | | | |
| Cy.La.S | 10 | 46.4 | | | | | | 0.8 | | | |
| Cy.S.La | 10 | 45.2 | | | | | | 0.8 | | | |
| Ci.La.La | 2 | 36.1 | | | | | | 0.7 | | | |
| Cy.S.S | 10 | 64.0 | | | | | | 0.7 | | | |
| P.Ci.S | 6 | 49.4 | | | | | | 0.6 | | | |
| Ci.La.S | 6 | 44.3 | | | | | | 0.6 | | | |
| Ci.S.La | 6 | 45.2 | | | | | | 0.6 | | | |
| La.Ci.S | 6 | 45.9 | | | | | | 0.6 | | | |
| Cy.P.La | 8 | 40.8 | | | | | | 0.6 | | | |
| Cy.La.P | 8 | 41.1 | | | | | | 0.6 | | | |
| La.My.My | 4 | 48.5 | | | | | | 0.6 | | | |
| Ci.S.S | 8 | 58.9 | | | | | | 0.5 | | | |
| Cy.S.P | 10 | 58.0 | | | | | | 0.5 | | | |
| P.Cy.S | 10 | 47.4 | | | | | | 0.5 | | | |
| Cy.P.S | 10 | 58.8 | | | | | | 0.5 | | | |
| La.Cy.La | 4 | 34.9 | | | | | | 0.5 | | | |
| My.My.S | 10 | 54.0 | | | | | | 0.5 | | | |
| Ci.P.La | 6 | 43.2 | | | | | | 0.5 | | | |
| Ci.La.P | 6 | 41.1 | | | | | | 0.5 | | | |
| Ci.P.S | 8 | 55.1 | | | | | | 0.4 | | | |
| Ci.S.P | 8 | 54.3 | | | | | | 0.4 | | | |
| Cy.P.P | 8 | 53.0 | | | | | | 0.4 | | | |
| La.Ci.La | 2 | 40.2 | | | | | | 0.4 | | | |
| S.Cy.S | 10 | 52.8 | | | | | | 0.3 | | | |

Figure 3/5

| TAG | ΔC-atoms | $T_{SL}$ [°C] | 10RPh70/ 90BO65 | 30RPh70/ 70BO65 | 50AR60/ 50RP69 | 50AR60/ 50CS62 | 50PO58/ 50SF69 | in(40PO58/ 60PK39) | 40dfPOs/ 60RPh70 | 50RPh70/ 50SF69 | 75in(RPh70)/ 25BO65 |
|---|---|---|---|---|---|---|---|---|---|---|---|
| | | | concentration [w/w %] | | | | | | | | |
| La.La.E | 6 | 35.0 | | | | | | 0.3 | | | |
| My.La.My | 2 | 134.0 | | | | | | 0.3 | | | |
| Ci.P.P | 6 | 50.9 | | | | | | 0.3 | | | |
| La.Cy.My | 6 | 32.8 | | | | | | 0.3 | | | |
| Cy.La.My | 6 | 35.8 | | | | | | 0.3 | | | |
| Cy.My.La | 6 | 36.2 | | | | | | 0.3 | | | |
| La.S.E | 6 | 46.8 | | | | | | 0.3 | | | |
| E.La.S | 6 | 47.7 | | | | | | 0.3 | | | |
| La.E.S | 6 | 46.8 | | | | | | 0.3 | | | |
| My.S.My | 4 | 59.9 | | | | | | 0.2 | | | |
| Cy.S.My | 10 | 51.8 | | | | | | 0.2 | | | |
| Cy.My.S | 10 | 53.0 | | | | | | 0.2 | | | |
| Ci.My.La | 4 | 40.3 | | | | | | 0.2 | | | |
| La.Ci.My | 4 | 38.7 | | | | | | 0.2 | | | |
| Ci.La.My | 4 | 38.3 | | | | | | 0.2 | | | |
| La.E.P | 6 | 43.1 | | | | | | 0.2 | | | |
| P.La.E | 6 | 42.0 | | | | | | 0.2 | | | |
| La.P.E | 6 | 42.8 | | | | | | 0.2 | | | |
| P.Cy.P | 6 | 48.2 | | | | | | 0.2 | | | |
| My.P.My | 2 | 58.7 | | | | | | 0.2 | | | |
| Ci.My.S | 8 | 50.3 | | | | | | 0.2 | | | |
| My.Ci.S | 8 | 49.1 | | | | | | 0.2 | | | |
| Ci.S.My | 8 | 49.7 | | | | | | 0.2 | | | |
| Cy.P.My | 8 | 47.0 | | | | | | 0.2 | | | |
| Cy.My.P | 8 | 47.5 | | | | | | 0.2 | | | |
| My.Cy.P | 8 | 39.9 | | | | | | 0.2 | | | |
| La.E.La | 6 | 36.6 | | | | | | 0.2 | | | |
| P.Ci.P | 6 | 51.9 | | | | | | 0.1 | | | |
| Cy.Cy.La | 4 | 17.4 | | | | | | 0.1 | | | |
| Ci.P.My | 6 | 46.9 | | | | | | 0.1 | | | |
| Ci.My.P | 6 | 46.6 | | | | | | 0.1 | | | |
| My.Ci.P | 6 | 44.4 | | | | | | 0.1 | | | |
| TAG(Δ≥C4; $T_{SL}$>55°C) | | | 8.5 | 25.4 | 3.8 | 3.8 | 2.6 | 17.0 | 51.4 | 43.9 | 50.4 |
| 25<$T_{SL}$<55 | | | 0 | 0 | 31.3 | 31.4 | 1.0 | 67.3 | 19.8 | 0 | 0 |

POURABLE FATTY DISPERSIONS

BACKGROUND OF THE INVENTION

1. Field of the Invention

The present invention relates to pourable fatty dispersions consisting of a triglyceride oil in which a non-fat phase is dispersed and which dispersion further contains a stabilising amount of triglyceride fat. A preferred fatty dispersion is liquid margarine.

STATE OF THE ART

2. The Related Art

Margarine consists of a continuous fat phase and an aqueous phase which is dispersed as fine droplets in the fat phase. In contrast to common margarine which has a semi-solid, plastic, spreadable consistency, liquid margarine is pourable at ambient temperature.

All margarine fat consists of a mixture of a fat which at ambient temperature is fully liquid (an oil), and a fat which is solid at ambient temperature, the so-called hardstock fat which has stabilising functionality. The ratio of liquid and solid fat is chosen such that after proper processing together with an aqueous phase a product with a suitable plastic consistency is obtained. In common margarine the crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented. Wrapper margarines need more solid fat than tub margarines and tub margarines need more than liquid margarines. Moreover, liquid margarines need a different kind of stabilising fat.

The presence of hardstock fat aims to stabilise the margarine emulsion. Unstable liquid margarines show phase separation. Phase separation, particularly oil exudation, becomes visible as a layer of oil on the surface of the liquid margarine.

It is desired that a stable liquid margarine of good quality is substantially free from oil exudation, yet exhibits good pourability. It is difficult to combine good stability with good pourability. The solid fat crystals are needed for the stability of the emulsion, but on the other hand may adversely affect its pourability. Liquid margarine manufacture therefore requires a hardstock fat with properties which are delicately balanced.

The problem of preparing a satisfactory liquid margarine has been addressed years ago as evidenced by the following patent documents: U.S. Pat. No. 3,595,674, SU 553964, JP 51133453, U.S. Pat. Nos. 5,756,142, 3,338,720, 4,446,165, 4,341,812, GB 1092236.

Although prior art mentions several fully hydrogenated fats for use as liquid margarine hardstock fat, there is seldom found any specification of their performance. Generally, vaguely defined mixtures of fully hydrogenated fats are included in such prior art references, however, without specification of type of fats, blend ratios or performance.

TABLE I

LIQUID MARGARINE (80% FAT) PREPARED WITH SUNFLOWER OIL AND COMMON MARGARINE HARDSTOCK FATS
Stability and Pourability

|   | Hardstock fat (HS) (1) | HS (2) (wt. %) | Oil exudation (3) [v/v %] | * | Bostwick value (4) [cm/15 sec] | # | @ |
|---|---|---|---|---|---|---|---|
|   | SINGLE FAT |  |  |  |  |  |  |
| 1 | SF69 | 2 | 4.5 | – | 23 | + | –+ |
| 2 | BO65 | 2 | 4.5 | – | 23 | + | –+ |
| 3 | RP68 | 2 | 4.5 | – | 23 | + | –+ |
| 4 | PO58 | 2 | 11 | – | 2 | – | –– |
| 5 | dfPOs (5) | 2 | 7.3 | — | 20 | + | –+ |
| 6 | AR60 | 2 | 3 | – | 20 | + | –+ |
| 7 | CS62 | 2 | 10 | – | 24 | + | –+ |
| 8 | Rph70 | 2 | 0.7 | + | 22 | + | ++ |
|   | FAT BLEND |  |  |  |  |  |  |
| 9 | dfPOs/RPh70 | 0.8/1.2 | 0.7 | + | 4 | – | +– |
| 10 | in(PO58/PK39) (6) | 1.2/0.8 | 6 | – | 18 | + | –+ |

(1) Abbreviations explained in Table II
(2) Percentage of hardstock fat on fat phase
(3) *: Oil exudation is measured for stability,
+: oil exudation 2 or less, adequate
–: oil exudation >2, not adequate
(4) #: Bostwick value is measure for pourability
+: Bostwick value ≧15, adequate
–: Bostwick value <15, not adequate
@ ++: good quality liquid margarine hardstock
–+, +–, ––: stability and/or pourability not adequate
(5) dfPOs is dry fractionated palm oil stearin with a slip melting point of 52° C..
(6) The fat mixture is used after interesterification.

Table I shows the poor performance of some common margarine hardstock fats when applied in a liquid margarine.

Stability is measured by an oil exudation test and pourability by the Bostwick test. The standard for stability is an oil exudation rating being 2 or less and the standard for pourability is a Bostwick value being at least 15.

A liquid margarine having a pourability rating <15 is too thick and lacks acceptable pourability.

An oil exudation rating >2 points to an unacceptable inhomogeneous product appearance and bad kitchen performance.

Both tests and a general liquid margarine preparation are described later in the specification.

Hence in the context of the present specification an emulsion, or, generally, a fatty dispersion is pourable and stable when it complies with the above standards.

TABLE II

FULLY HYDROGENATED FATS

| Abbreviation | Name starting fat | Melting point (° C.) |
|---|---|---|
| SF69 | Sunflower seed oil | 69 |
| BO65 | Soybean oil | 65 |
| RP68 | Low erucic rapeseed oil | 68 |
| PO58 | Palm oil | 58 |
| RPh70 | High erucic rapeseed oil | 70 |
| PK39 | Palm kernel oil | 39 |
| AR60 | Arachidic oil | 60 |
| CS62 | Cottonseed oil | 62 |

Fully hydrogenated high erucic rapeseed oil (shortly denoted as fully hardened rapeseed oil or RPh70) has appeared to be the only hardstock fat which complies with the above standards. It is widely used for the manufacture of satisfactory liquid margarines which combine good stability with good pourability. Presently, from all above mentioned fats solely fully hardened rapeseed oil is employed for the preparation of high quality liquid margarine. Its use is described e.g. in U.S. Pat. No. 5,756,142.

RPh70 is unrivalled as hardstock fat also for use in other pourable fatty dispersions consisting of a triglyceride oil in which a non-fat phase is dispersed. WO 98/47386, for example, deals with the stabilisation of a pourable fatty dispersion containing herbs as the dispersed phase. Besides RPh70, other fats are mentioned as possible hardstock fat: hardened sunflower seed oil, hardened soybean oil, hardened palm oil, hardened cottonseed oil or mixtures thereof. Besides RPh70 only hardened sunflower seed oil has been exemplified. The product is said to have "acceptable properties".

Generally, liquid margarines are prepared with 2–5 wt. % of hardstock fat on total fat phase.

RPh70 may be unsurpassed as liquid margarine hardstock fat, its use also has less favourable aspects. Rph70 is derived from a fat with a high erucic acid content. From a nutritional point of view erucic acid should be avoided in food compositions. Hydrogenation of the unsaturated erucic acid does not fully remedy this. Another drawback of Rph70 is its high price.

Besides that, liquid margarine hardstock fats are wanted which have a stability and pourability performance which is better than what Rph70 can offer.

SUMMARY OF THE INVENTION

We have discovered the parameters which define well performing hardstock fats to be used for the manufacture of liquid margarines. First it was found that for proper performance such fats should solidify as small mixed crystals rather than as an extended fat crystals lattice such as is needed for the plastic consistency of common margarines.

Then, the conditions for the formation of such mixed crystals have been found to be related in a specific way to the amount and the nature of the triacylglycerides (TAGs) which constitute the hardstock fat.

The present invention provides a hardstock fat suited for stabilizing a pourable dispersion of a non-fat phase in a triglyceride oil, which hardstock fat consists of a mixture of triglycerides, characterized in that, at least two triglycerides having a melting point >55° C. each have a concentration of at least 5 wt. %, the amount of triglycerides having fatty acid residues with a difference in chain length of the longest and the shortest residue being at least four carbon atoms is at least 15 wt. % and the amount of triglycerides having a melting point of 25–55° C. is $\leq 25$ wt. %.

Fully hardened high erucic rapeseed oil (Rph70) fulfills the conditions of this definition. This fat has been found earlier by chance and is an isolated representative of the group of invented fats. Because it is known, Rph70 is excluded from the invention by a disclaimer.

The invention comprises also liquid margarines and other pourable fatty dispersions containing hardstock fat and which fat is comprised in the invention.

BRIEF DESCRIPTION OF THE DRAWING

FIG. 1 is a reference table containing most triacylglycerides (TAG's) each with its melting temperature ($T_{SL}$) in its most stable modification and with the difference in carbon chain length of the shortest and the longest acyl group.

Data sources (e.g.): Wesdorp, L. H. "Liquid-multiple solid phase equilibria in fats", PhD-thesis, (1990) TU Delft; Garti, N., Sato, K.: "Crystallization and polymorphism of fats and fatty acids", ISBN: 0-8247-7875-8). Abbreviations explained in Table III below.

FIG. 2 (single fats) and FIG. 3 (fat blends) show for a number of fats (abbreviations explained in Tables II and III) the TAG composition as far as the TAG's are present in an amount of at least 0.1 wt. %.

They also mention the TAG's melting temperature ($T_{SL}$) and carbon number difference of longest and shortest acyl group.

TABLE III

| Abbrev | Common name | Systematic name |
|---|---|---|
| A | arachidic acid | eicosanoic acid |
| B | behenic acid | docosanoic acid |
| Ci | capric acid | decanoic acid |
| Cy | caprylic acid | octanoic acid |
| E | elaidic acid | 9-octadecenoic acid (E) |
| L | linoleic acid | 9,12-octadecadienoic acid (Z, Z) |
| La | lauric acid | dodecanoic acid |
| Le | linolenic acid | 9,12,15-octadecatrienoic acid (Z, Z, Z) |
| My | myristic acid | tetradecanoic acid |
| O | oleic acid | 9-octadecenoic acid (Z) |
| P | palmitic acid | hexadecanoic acid |
| S | stearic acid | octadecanoic acid |
| Tc | lignoceric acid | tetracosanoic acid |

DETAILED DESCRIPTION

Hardstock fats which are prepared for use in margarine fat consist for at least 90 wt. % of saturated triglycerides. The hardstock fat is mixed with a liquid fat. The liquid fat may contain some saturated triglycerides but the amount is too low for stabilisation. The present saturated triglycerides and the saturated triglycerides added by admixture of the hardstock fat together are by definition the hardstock fat part of the margarine fat blend.

The invented hardstock fats crystallize with a crystal habitus which makes those fats suited for satisfactory performance in a liquid margarine. Particularly, those fats crystallize as small mixed crystals which on the one hand properly stabilize the margarine emulsion and minimize oil exudation to an acceptable extent and on the other hand allow a good pourability.

The absence of relatively high amounts of low melting triglycerides prevents that the solid phases of hardstock fats would crystallize on top of each other. This so-called sintering is the cause of the undesired brittle crystal structure which adversely affects the emulsion pourability. It has been found that particularly triglycerides melting at 25–55° C. are inclined to enhance sintering and spoil the pourability. Therefore the invention requires all such triglycerides to be present in a concentration $\leq 25$ wt. %. Preferably, those triglycerides melting at 25–55° C. are present in a concentration even $\leq 20$ wt. %. More preferably, all triglycerides melting at the wider range of 20–55° C. are present in a concentration $\leq 20$ wt. %.

Triglycerides having fatty acid residues with a difference in chain length of the longest and the shortest residue of at least four carbon atoms must be present in an amount of at least 15 wt. % and these, preferably, have a melting point >55° C.

We have found that liquid margarines containing hardstock fat with the above triacylglycerides (TAG) specification satisfy the abovementioned stability and pourability standards. Their properties may be as good as those of Rph70 stabilized liquid margarines.

A hardstock fat is said to stabilize properly a liquid dispersion of a non-fat phase in a triglyceride oil, denoted as a fatty dispersion, when the oil exudation test is passed with a rating 2 or less. A stabilizing amount of hardstock fat is the minimum amount which is necessary for imparting a proper stability to the dispersion. Only 2 wt. % of an invented hardstock fat is needed for attaining such stability. A liquid margarines containing this amount of the invented hardstock fats is stable and nevertheless exhibits a proper pourability which means that the rating according to the Bostwick test is at least 15.

The present invention deals with the performance of hardstock fats in preventing oil exudation in fat continuous dispersions, while an acceptable pourability of the dispersion is maintained. For proper comparison of data all measurements are carried out with liquid margarines all of which contain 80 wt. % of fat and 20 wt. % of a dispersed aqueous phase. The present invention is applicable, however, with fat phases containing 1–80 wt. % of a dispersed fat immiscible phase.

The hardstock fats according to the invention are novel. Starting from one or more known fats, preferably vegetable fats, they can be obtained by processing usual triglyceride fats comprising blending, interesterification, hydrogenation or by a combination of these treatments in any proper order. Acidolysis with a fatty acid or a mixture of fatty acids may be a proper process for substituting the fatty acid residues of a chosen starting fat by desired fatty acid residues.

That the hardstock fat preferably is a vegetable fat means that when choosing for blending or processing the constituting fats less than 10 wt. % of non-vegetable fat calculated on total hardstock is used.

Interesterification and acidolysis may be applied either as a chemical process or as an enzymatic rearrangement process. Methods for carrying out those common fat treatments are well known in the art.

Suitable hardstock fats according to the invention comprise blends of (weight ratios between brackets) RPh70 and SF69 (1/1), BO65 and Rph70 (7/3), SF69 and in(RPh70) (1/1), in (Rph70 ) and BO65 (3/1), further Rph70 interesterified with itself (denoted as in (RPh70)), the product of acidolysis of PO58 with arachidic acid (3/1) and the product of interesterification of SF69 with glyceride tribehenate (4/1). Abbreviations are explained in Table II.

The ratios of the fats in the blends can not be chosen arbitrarily. For showing a satisfactory performance the triglycerides composition of the final blend should comply with the claim definition. Given the triglyceride composition of a desired claimed fat the man skilled in the art of triglyceride fat technology is able to calculate which fats and which fat treatments he needs to obtain the desired fat. When an enzymatic rearrangement has been involved it may be necessary to subject the obtained fat to a triglycerides analysis for establishing correctly whether the fat fits in the claim definition.

Since for most generally available fats the triglyceride composition is known or can be analyzed and the $\Delta C$ and $T_{SL}$ are known data, the man skilled in the art of fat technology is able to choose and process available fats in such way that a fat is obtained showing the desired triglyceride composition and which fits in the claim definition.

For example, given the qualitative and quantitative triglycerides composition of starting fats in(Rph70 ) and BO65, the effect of blending a (3/1) mixture of both components is shown in Table IV.

TABLE IV

| Triglycerides in starting fats and product blend | STARTING FATS | | PRODUCT BLEND 75 A + 25 B wt. % |
|---|---|---|---|
| | intra-esterified RPh70 (A) wt. % | BO65 (B) wt. % | |
| With $\Delta C \geq 4$ $T_{SL} > 55°$ C. | 68.9 | 0.6 | 51.8 |
| For which $T_{SL} = 15° – 55°$ C. | 0 | 0 | 0 |
| S.B.B $T_{SL} = 73.5°$ C. | 15.4 | 0 | 11.6 |
| S.S.B $T_{SL} = 70.7°$ C. | 14.1 | 0 | 10.6 |
| S.S.S $T_{SL} = 73.0°$ C. | 6.5 | 65.8 | 16.5 |
| P.S.S $T_{SL} = 65.0°$ C. | 1.9 | 28.0 | 7.0 |
| Other TAG's with $\Delta C \geq 4$ $T_{SL} > 55°$ C. | 39.4 | 0.6 | 6.1 |
| Complies with claim 1 | Yes | No | Yes |

$\Delta C \geq 4$ means a difference of at least 4 carbon atoms between the longest and the shortest fatty acid residue $T_{SL}$ denotes melting point triglyceride.

Fatty acids abbreviations explained in Table III. Relevant data for the constituting triglycerides can be found in textbooks, while many are collected in the Table of FIG. 1.

The hardstock fats according to the present invention are suited not only for stabilizing liquid margarines, but also for any other pourable fatty dispersion. With a fatty dispersion is meant a continuous liquid fat in which a fat immiscible phase has been dispersed. Besides of a dispersed aqueous phase such fat immiscible phase may also consist of solid particles, such as powders, speckles or herbs. The hardstock fat helps to prevent or retard settling of the dispersed particles.

A product consisting of a stabilized pourable fatty dispersion which comprises a liquid oil and a hardstock fat can be obtained by admixing the invented hardstock fat as such into the liquid oil at any proper point of time when preparing the product. Alternatively, the hardstock fat may be incorporated into the liquid oil by admixing the fats constituting the hardstock blend separately with the oil, with the final effect that a stabilized pourable fat phase is obtained which can not be distinguished from a fat phase obtained by direct addition of the invented hardstock fat to the fat phase. It is noticed that when choosing fatty material with hardstock functionality the presence of fully saturated triglycerides already present in the liquid oil part of the fat phase of the dispersion also contributes to the fat phase stabilisation and therefore is considered to be a part of the hardstock fat contained in the fat phase of the ready dispersion. In the context of the present specification the totality of all saturated triglycerides resent in a triglycerides fat mixture is by definition the hardstock fat part of that mixture. A saturated triglyceride contains only saturated acyl moieties. Hence the invention also comprises a stabilized, yet pourable fat phase containing 1–80 wt. %, preferably 1–60 wt. %, more preferably 1–40 wt. % of a dispersed fat-immiscible phase, such pourable fat phase including liquid margarines, where the fat phase contains hardstock fat consisting of 1–10 wt. % and preferably 1–2 wt. % on total fat phase of saturated triglycerides, which hardstock fat complies with the above mentioned definition for a hardstock fat:

at least two saturated triglycerides having a melting point >55° C. both have a concentration of at least 5 wt. %, at least 15 wt. % of all saturated triglycerides have fatty acid residues with a difference in chain length of the longest and the shortest residue of at least four carbon atoms, the amount of saturated triglyceride with a melting point in the range 25–55° C. is ≦25 wt. % and with the proviso that pourable fat phases containing a fully hydrogenated high erucic rapeseed oil as the sole stabilizing hardstock fat are excluded from the invention.

The at least 15 wt. % of saturated triglycerides which have fatty acid residues with a difference in chain length of the longest and the shortest residue of at least four carbon atoms, preferably have a melting point of >55° C.

The pourable fat phase preferably is constituted by fats from vegetable origin, which means that it contains preferably less than 10 wt. % of fat of non-vegetable origin.

The invention also comprises the use of the hardstock fat as defined in the claims for the stabilisation of a triglyceride fat phase in which fat phase 1–80 wt. % of a fat-immiscible phase is dispersed.

All concentrations in this specification are weight concentrations unless indicated otherwise. Weight concentrations of triglycerides are calculated on total hardstock fat unless specified otherwise.

The invention is illustrated by the following examples:

General

Measuring Oil Exudation

A stoppered all glass measuring cylinder of 100 ml is filled up with the sample to the top mark. After two weeks storage at 15° C. the thickness of the separated oil layer is measured and expressed as vol. % on total sample volume. The vol. % is the rating for emulsion stability.

Measuring Pourability

Pourability is measured according to the standard Bostwick protocol which is provided with the equipment. The Bostwick equipment consists of a 125 ml reservoir provided with a outlet near the bottom of a horizontally placed rectangular tub and closed with a vertical barrier. The tub's bottom is provided with a 25 cm measuring scale, extending from the outlet of the reservoir. When equipment and sample both have a temperature of 15° C., the reservoir is filled with 125 ml of the sample after it has been shaken by hand ten times up and down. When the closure of the reservoir is removed the sample flows from the reservoir and spreads over the tub bottom. The path length of the flow is measured after 15 seconds. The value, expressed as cm per 15 seconds is the Bostwick rating, which is used as yard stick for pourability. Table V shows Pourability categories for liquid margarine.

TABLE V

POURABILITY CATEGORIES FOR LIQUID MARGARINE

| | |
|---|---|
| very thick | Bostwick < 1, |
| thick | Bostwick 1–5, |
| squeezeable | Bostwick 5–15, |
| pourable | Bostwick ≧ 15. |

EXAMPLES 1–5

General Liquid Margarine Preparation

In a premix tank a mixture is prepared consisting of 20 wt. % of aqueous phase, 78 wt. % of sunflower seed oil and 2 wt. % of hardstock fat. Table VI shows a general composition.

TABLE VI

COMPOSITION OF LIQUID MARGARINE

| wt. % | Liquid margarine |
|---|---|
| 80 | at phase |
| 18.4 | Water |
| 1.0 | Salt |
| 0.6 | Emulsifier |

The temperature of the premix is increased to 65° C., at which temperature all hardstock fat will liquefy. After 10 minutes stirring at this temperature the mixture is cooled to 35° C. Consecutively, the mixture is conducted at a throughput of 4 kg/h through a scraped surface heat exchanger (800 rpm, exit 18° C.), a second scraped surface heat exchanger (800 rpm, exit 5° C.), a 150 ml resting unit and finally through a 150 ml pin stirrer unit (1500 rpm, exit 17° C.). The pin stirrer delivers a liquid margarine which is ready for packaging.

Using the above general preparation for liquid margarines products have been obtained with fat phase compositions mentioned in Table VII.

TABLE VII

LIQUID MARGARINE (80% FAT) STABILISED WITH HARDSTOCK FAT
Stability and Pourability

| Example | Hardstock fat (HS) (1) | HS (2) (wt. %) | Oil exudation (3) [v/v %] | * | Bostwick value (4) [cm/15 sec] | # | @ |
|---|---|---|---|---|---|---|---|
| 1 | in (RPh70) | 2 | 0.5 | + | 15 | + | ++ |
| 2 | in (RPh70)/BO65 | 1.5/0.5 | 1.5 | + | 17 | + | ++ |
| 3 | SF69/RPh70 | 1/1 | 0.7 | + | 21 | + | ++ |
| 4 | BO65/RPh70 | 1.4/0.6 | 1.0 | + | 17 | + | ++ |
| 5 | BO65/RPh70 | 1/1 | 0.8 | + | 15 | + | ++ |
| 6 | RPh70/SF69 | 1.5/0.5 | 0.5 | + | 22 | + | ++ |
| COMPARISON | | | | | | | |
| 7 | RPh70 | 2 | 0.7 | + | 22 | + | ++ |

(1) Abbreviations explained in Table II
(2) Percentage of hardstock fat on fat phase
(3) *: Oil exudation is measure for stability, +: Oil exudation 2 or less, −: Oil exudation >2
(4) #: Bostwick value is measure for pourability, +: Bostwick value ≧ 15, −: Bostwick value < 15, @ ++: good quality liquid margarine hardstock which satisfies the stability as well as the pourability 5 standards.

The stability and pourability performance of the products have been measured according to the standard methods above. For comparison the stability and pourability ratings of a liquid margarine prepared with RPh70 have been included.

What is claimed is:

1. A hardstock fat suitable for stabilizing a pourable dispersion of a non-fat phase in a triglyceride oil, which hardstock fat consists essentially of a mixture of triglycerides, of which at least two triglycerides having a melting point >55° C. each have a concentration of at least 5 wt. %, the amount of triglycerides having fatty acid residues with a difference in chain length of the longest and the shortest residue being at least four carbon atoms is at least 15 wt. %, the amount of triglycerides having a melting point of 25–55° C. is ≦25 wt. % and with the proviso that the hardstock fat is not solely a fully hardened high erucic rapeseed oil.

2. A hardstock fat according to claim 1, in which the at least 15 wt. %. of triglycerides having fatty acid residues with a difference in chain length of the longest and the shortest residue being at least four carbon atoms have a melting point >55° C.

3. A hardstock fat according to claim 1, where the amount of triglycerides having a melting point of 25–55° C. is ≦20 wt. %.

4. A hardstock fat according to claim 1, where the amount of triglycerides having a melting point of 20–55° C. is ≦20 wt. %.

5. A hardstock fat according to claim 1, which is a vegetable hardstock fat.

6. A pourable fat phase which contains 1–80 wt. % of a dispersed fat-immiscible phase, which fat phase further contains 1–10 wt. % on total fat phase of saturated triglycerides of which saturated triglycerides at least two triglycerides having a melting point of >55° C. each have a concentration of at least 5 wt. %, at least 15 wt. % of all saturated triglycerides contain fatty acid residues with a difference in chain length of the longest and the shortest residue being at least four carbon atoms, the amount of saturated triglycerides having a melting point of 25–55° C. is ≦25 wt. % and with the proviso that pourable fat phases containing fully hydrogenated high erucic rapeseed oil as the sole stabilizing hardstock fat are excluded.

7. A pourable fat phase according to claim 6, where the at least 15 wt. % of saturated triglycerides which contain fatty acid residues with a difference in chain length of the longest and the shortest residue being at least four carbon atoms have a melting point >55° C.

8. A pourable fat phase according to claim 6, where the amount of saturated triglycerides having a melting point of 25–55° C. is ≦20 wt. %.

9. A pourable fat phase according to claim 6, where the amount of saturated triglycerides having a melting point of 20–55° C. is ≦20 wt. %.

10. A pourable fat phase according to claim 6, which is constituted by fats of vegetable origin.

* * * * *